US010563867B2

(12) United States Patent
Bunker et al.

(10) Patent No.: US 10,563,867 B2
(45) Date of Patent: Feb. 18, 2020

(54) CMC ARTICLES HAVING SMALL COMPLEX FEATURES FOR ADVANCED FILM COOLING

(71) Applicant: General Electric Company, Schenectady, NY (US)

(72) Inventors: Ronald Scott Bunker, West Chester, OH (US); Kevin Robert Feldmann, Mason, OH (US); Douglas Ray Smith, Hamilton, OH (US); Kirk D. Gallier, Liberty Township, OH (US); Daniel Scott Martyn, Mason, OH (US); Rachel Anne Vukoja, Florence, KY (US)

(73) Assignee: General Electric Company, Schenectady, NY (US)

(*) Notice: Subject to any disclaimer, the term of this patent is extended or adjusted under 35 U.S.C. 154(b) by 1165 days.

(21) Appl. No.: 14/870,829

(22) Filed: Sep. 30, 2015

(65) Prior Publication Data
US 2017/0089578 A1  Mar. 30, 2017

(51) Int. Cl.
*F23R 3/00* (2006.01)
*F02C 7/12* (2006.01)
(Continued)

(52) U.S. Cl.
CPC .............. *F23R 3/007* (2013.01); *F01D 5/186* (2013.01); *F01D 5/284* (2013.01); *F02C 7/12* (2013.01);
(Continued)

(58) Field of Classification Search
CPC .. F23R 3/002; F23R 3/007; F23R 3/06; F23R 2900/03042; F01D 5/145; F01D 5/186;
(Continued)

(56) References Cited

U.S. PATENT DOCUMENTS 6,234,755 B1   5/2001  Bunker et al.
6,325,593 B1 * 12/2001  Darkins, Jr. ............ F01D 5/186
                                                    415/115
(Continued)

FOREIGN PATENT DOCUMENTS

CN   102261281 A   11/2011
CN   103069112 A    4/2013
(Continued)

OTHER PUBLICATIONS

JP2014214632 Machine Translation; translated Jan. 2018.*
(Continued)

*Primary Examiner* — Phutthiwat Wongwian
*Assistant Examiner* — Loren C Edwards
(74) *Attorney, Agent, or Firm* — Dority & Manning, P.A.

(57) ABSTRACT

An engine component for a gas turbine engine generating hot combustion gas flow is provided. The engine component can include a substrate constructed from a CMC material and having a hot surface facing the hot combustion gas flow and a cooling surface facing a cooling fluid flow. The substrate defines a film hole extending through the substrate and having an inlet provided on the cooling surface, an outlet provided on the hot surface, and a passage connecting the inlet and the outlet. The engine component also includes a flow conditioning structure provided upstream of the outlet on the hot surface. The flow conditioning structure can include a ridge extending from the hot surface.

19 Claims, 7 Drawing Sheets

(51) Int. Cl.
　　　*F01D 5/18*　　　(2006.01)
　　　*F01D 5/28*　　　(2006.01)

(52) U.S. Cl.
　　　CPC ........ *F23R 3/002* (2013.01); *F05D 2250/611* (2013.01); *F05D 2250/711* (2013.01); *F05D 2250/712* (2013.01); *F05D 2260/202* (2013.01); *F05D 2300/6033* (2013.01); *F23R 2900/03042* (2013.01); *Y02T 50/672* (2013.01); *Y02T 50/676* (2013.01)

(58) Field of Classification Search
　　　CPC .......... F01D 5/187; F01D 5/284; F01D 25/12; F01D 9/065; F02C 7/12; F02C 7/141; F02C 7/18; F05D 2250/611; F05D 2250/711; F05D 2250/712; F05D 2260/202; F05D 2300/6033; Y02T 50/672; Y02T 50/676
　　　USPC .......................................................... 60/753
　　　See application file for complete search history.

(56) References Cited

U.S. PATENT DOCUMENTS

| | | | |
|---|---|---|---|
| 6,383,602 B1 | 5/2002 | Fric et al. | |
| 6,554,563 B2* | 4/2003 | Noe | F01D 5/189 415/115 |
| 6,904,757 B2 | 6/2005 | Mitchell et al. | |
| 7,328,580 B2 | 2/2008 | Lee et al. | |
| 7,997,867 B1 | 8/2011 | Shih et al. | |
| 8,057,179 B1 | 11/2011 | Liang | |
| 8,057,181 B1 | 11/2011 | Liang | |
| 8,572,981 B2 | 11/2013 | Bunker | |
| 8,689,586 B2 | 4/2014 | Hirayama et al. | |
| 2005/0123401 A1 | 6/2005 | Bunker et al. | |
| 2005/0135931 A1 | 6/2005 | Nakamata et al. | |
| 2008/0286090 A1 | 11/2008 | Okita | |
| 2011/0097191 A1 | 4/2011 | Bunker | |
| 2011/0271684 A1 | 11/2011 | Corsmeier et al. | |
| 2011/0293423 A1 | 12/2011 | Bunker et al. | |
| 2011/0305582 A1* | 12/2011 | Lee | F01D 5/186 416/97 R |
| 2011/0305583 A1 | 12/2011 | Lee et al. | |
| 2012/0111015 A1 | 5/2012 | Bunker | |
| 2013/0175015 A1 | 7/2013 | Tanaka et al. | |
| 2013/0205787 A1 | 8/2013 | Zelesky et al. | |
| 2013/0205791 A1 | 8/2013 | Mongillo, Jr. et al. | |
| 2013/0205792 A1 | 8/2013 | Gleiner et al. | |
| 2013/0209229 A1 | 8/2013 | Xu et al. | |
| 2013/0209236 A1 | 8/2013 | Xu | |
| 2013/0209269 A1 | 8/2013 | Gleiner et al. | |
| 2017/0089579 A1 | 3/2017 | Bunker et al. | |

FOREIGN PATENT DOCUMENTS

| | | | |
|---|---|---|---|
| EP | 3064707 A1 | 9/2016 | |
| JP | 2000087701 A | 3/2000 | |
| JP | 2012202280 A | 10/2012 | |
| JP | 2014214632 * | 11/2014 | ............... F01D 5/18 |
| JP | 2014214632 A | 11/2014 | |
| WO | 2011082239 A1 | 7/2011 | |
| WO | WO 2013/188645 | 12/2013 | |

OTHER PUBLICATIONS

Ronald Scott Bunker et al., filed Sep. 30, 2015, U.S. Appl. No. 14/870,866.
European Search Report and Opinion issued in connection with Corresponding EP Application No. 16190937.9 dated Feb. 7, 2017.
European Search Report and Opinion issued in connection with Related EP Application No. 16190936.1 dated Feb. 8, 2017.
GE Related Case Form
First Office Action and Search issued in connection with corresponding CN Application No. 201610866284.1 dated Oct. 8, 2018 (English Translation not available).

* cited by examiner

CMC ARTICLES HAVING SMALL COMPLEX FEATURES FOR ADVANCED FILM COOLING

FIELD OF THE INVENTION

The present invention relates generally to ceramic matrix turbine engine components, and more particularly, to a ceramic matrix composite gas turbine engine component having small complex features.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. The higher temperatures reach and surpass the limits of the material of the components in the hot section of the engine and in particular the turbine section of the engine. Since existing materials cannot withstand the higher operating temperatures, new materials for use in high temperature environments need to be developed.

As the engine operating temperatures have increased, new methods of cooling the high temperature alloys comprising the combustors and the turbine airfoils have been developed. For example, ceramic thermal barrier coatings (TBCs) have been applied to the surfaces of components in the stream of the hot effluent gases of combustion to reduce the heat transfer rate, provide thermal protection to the underlying metal and allow the component to withstand higher temperatures. These improvements help to reduce the peak temperatures and thermal gradients of the components. Cooling holes have been also introduced to provide film cooling to improve thermal capability or protection. Simultaneously, ceramic matrix composites have been developed as substitutes for the high temperature alloys. The ceramic matrix composites (CMCs) in many cases provide an improved temperature and density advantage over metals, making them the material of choice when higher operating temperatures and/or reduced weight are desired.

CMCs have relatively low thermal conductivities and are thus well suited for use in high temperature environments for long periods of time. CMC components in the hot gas are heavily film cooled, particularly in designs with otherwise uncooled trailing edges. However, improved film cooling performance can decrease the required cooling film flow and/or increase the durability of the CMC component.

BRIEF DESCRIPTION OF THE INVENTION

Aspects and advantages of the invention will be set forth in part in the following description, or may be obvious from the description, or may be learned through practice of the invention.

An engine component is generally provided for a gas turbine engine generating hot combustion gas flow. In one embodiment, the engine component includes a substrate constructed from a CMC material and having a hot surface facing the hot combustion gas flow and a cooling surface facing a cooling fluid flow. The hot combustion gas flow generally defines an upstream direction and a downstream direction relative to the hot surface. The substrate defines a film hole extending through the substrate and having an inlet provided on the cooling surface, an outlet provided on the hot surface, and a passage connecting the inlet and the outlet. The engine component also includes a flow conditioning structure provided upstream of the outlet on the hot surface. In one particular embodiment, the flow conditioning structure comprises a ridge extending from the hot surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the phrases "constructed of CMCs" and "comprised of CMCs" shall mean components substantially constructed of CMCs. More specifically, the CMC components shall include more CMC material than just a layer or coating of CMC materials. For example, the components constructed of CMCs may be comprised or constructed substantially or entirely of CMC materials, including greater than about 50, 60, 70, 80, 90, or 100 percent CMC material.

Figure 1:
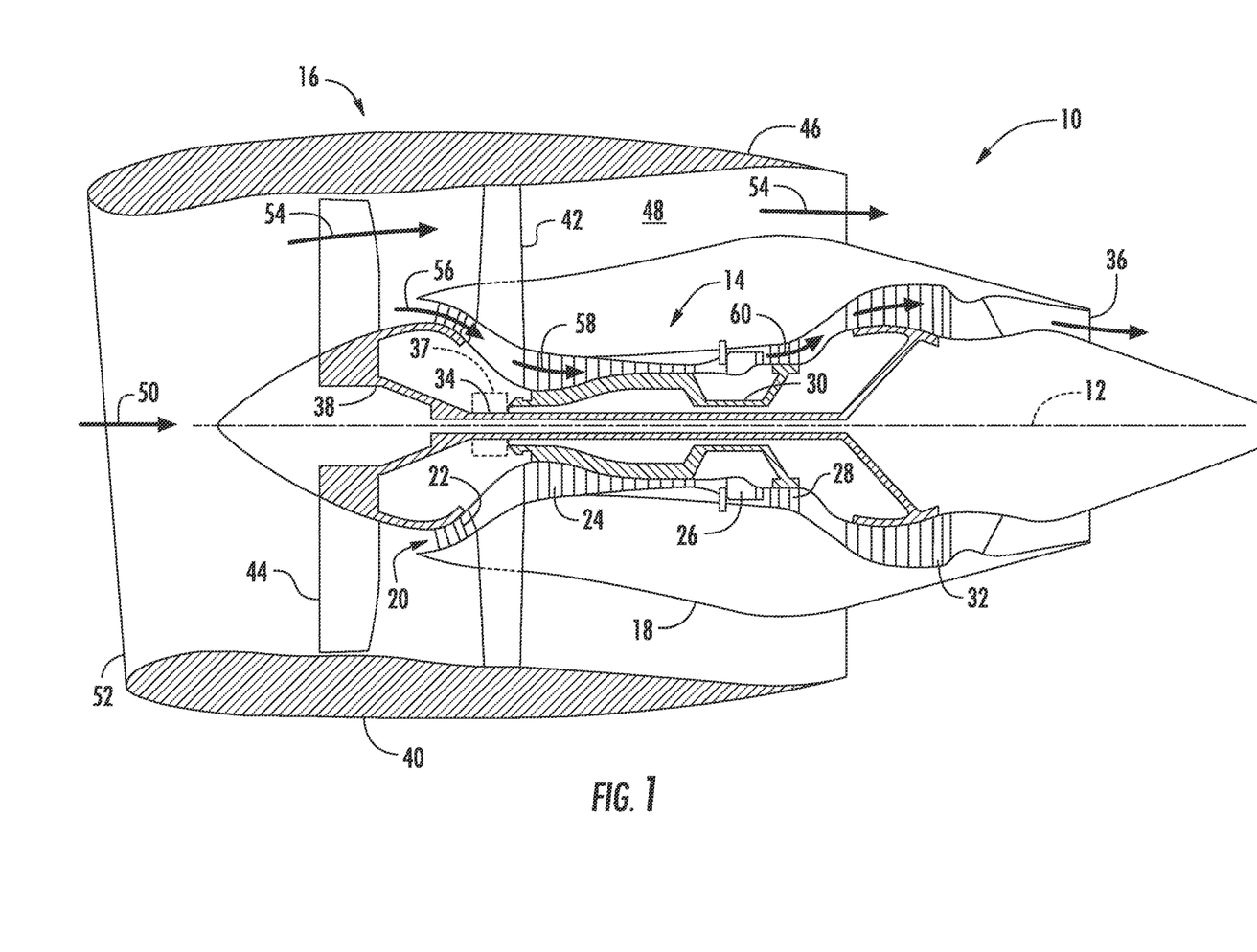
FIG. 1 shows a cross-sectional view of one embodiment of a gas turbine engine that may be utilized within an aircraft in accordance with aspects of the present subject matter.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure, HP) turbine 28 for driving the high pressure compressor 24 via a first (high pressure, HP) drive shaft 30, and then to a second (low pressure, LP) turbine 32 for driving the booster compressor 22 and fan section 16 via a second (low pressure, LP) drive shaft 34 that is generally coaxial with first drive shaft 30. After driving each of turbines 28 and 32, the combustion products may be expelled from the core engine 14 via an exhaust nozzle 36 to provide propulsive jet thrust.

It should be appreciated that each turbine 28, 30 may generally include one or more turbine stages, with each stage including a turbine nozzle and a downstream turbine rotor. As will be described below, the turbine nozzle may include a plurality of vanes disposed in an annular array about the centerline axis 12 of the engine 10 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 30 or 34).

Additionally, as shown in FIG. 1, the fan section 16 of the engine 10 may generally include a rotatable, axial-flow fan rotor 38 that configured to be surrounded by an annular fan casing 40. In particular embodiments, the (LP) drive shaft 34 may be connected directly to the fan rotor 38 such as in a direct-drive configuration. In alternative configurations, the (LP) drive shaft 34 may be connected to the fan rotor 38 via a speed reduction device 37 such as a reduction gear gearbox in an indirect-drive or geared-drive configuration. Such speed reduction devices may be included between any suitable shafts/spools within engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
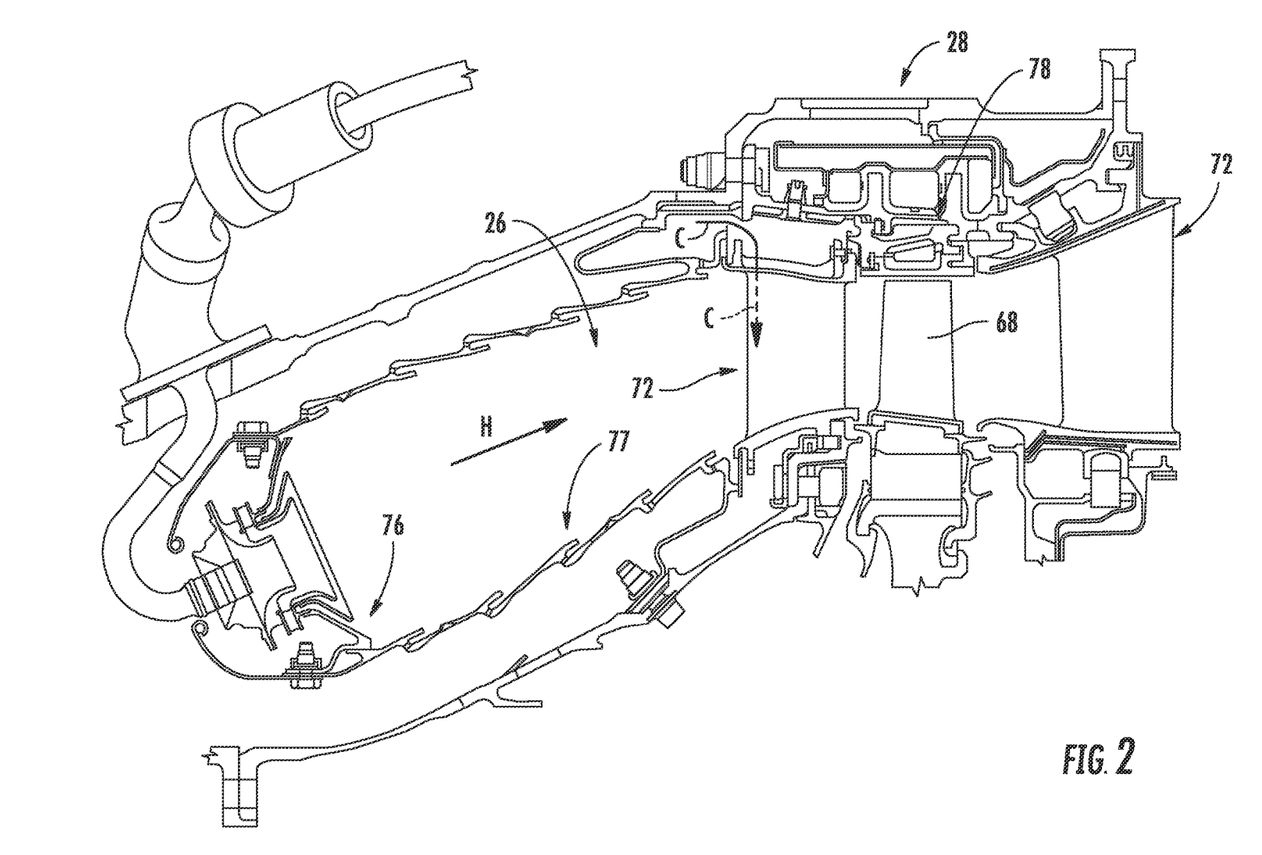
FIG. 2 shows a side section view of a combustor and a high pressure turbine of the engine from FIG. 1.

FIG. 2 is a side section view of the combustor 26 and first turbine 28 (i.e., the high pressure (HP) turbine) of the engine 10 from FIG. 1. The combustor 26 includes a deflector 76 and a combustor liner 77. Adjacent to the turbine blade 68 of the turbine 28 in the axial direction are sets of radially-spaced, static turbine vanes 72, with adjacent vanes 72 forming nozzles therebetween. The nozzles turn combustion gas to better flow into the rotating blades so that the maximum energy may be extracted by the turbine 28. A cooling fluid flow C passes through the vanes 72 to cool the vanes 72 as hot combustion gas flow H passes along the exterior of the vanes 72. A shroud assembly 78 is adjacent to the rotating blade 68 to minimize flow loss in the turbine 28. Similar shroud assemblies can also be associated with the LP turbine 32, the LP compressor 22, or the HP compressor 24.

One or more of the engine components of the engine 10 includes a film-cooled substrate in which a film hole of an embodiment disclosed further herein may be provided. Some non-limiting examples of the engine component having a film-cooled substrate can include the blades 68, vanes or nozzles 72, combustor deflector 76, combustor liner 77, or shroud assembly 78, described in FIGS. 1-2. Other non-limiting examples where film cooling is used include turbine transition ducts and exhaust nozzles.

Figure 3:
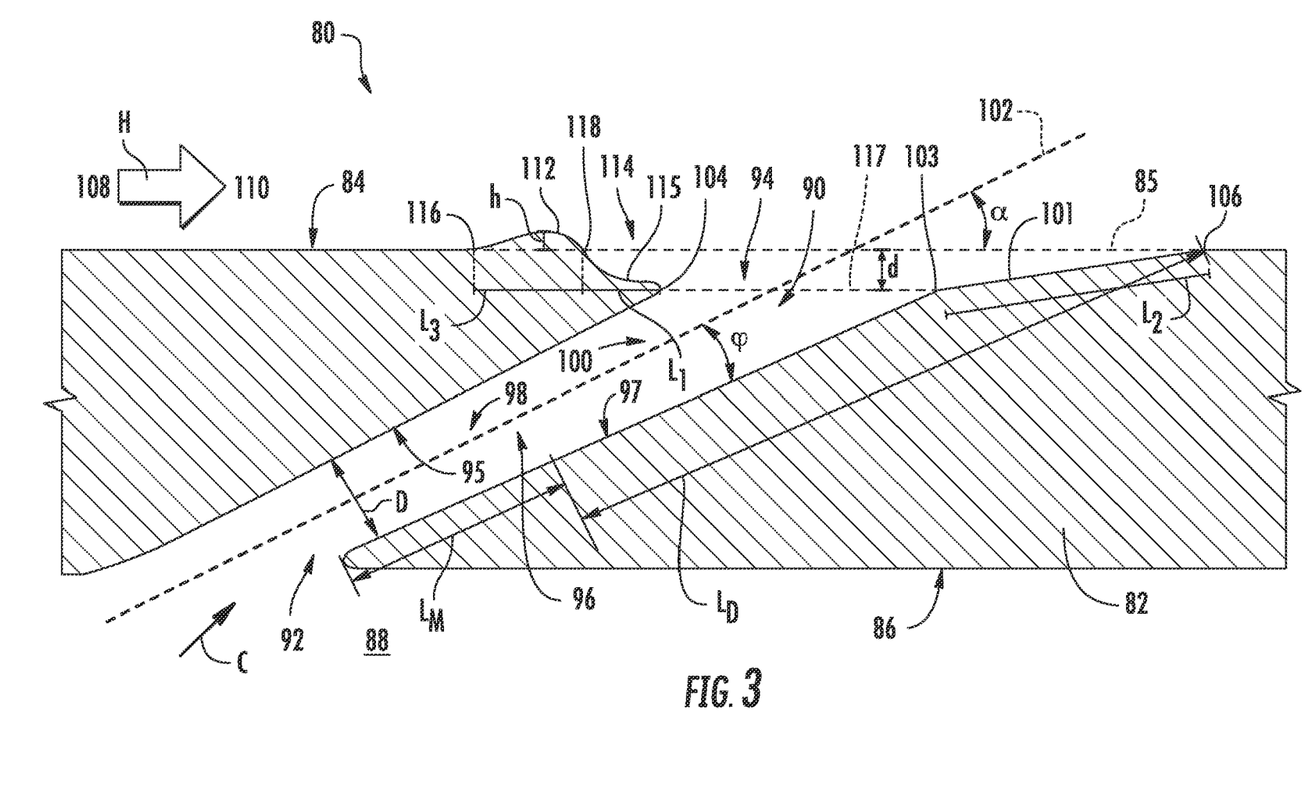
FIG. 3 is a schematic, sectional view through a film hole of an engine component of the engine from FIG. 1 according to one embodiment.

FIG. 3 is a schematic, sectional view showing a portion of an engine component 80 according to a first embodiment of the invention. The engine component 80 may be an engine component of the engine 10 from FIG. 1, and can be disposed in a flow of hot gas represented by arrow H. A cooling fluid flow, represented by arrow C may be supplied to cool the engine component. As discussed above with respect to FIGS. 1-2, in the context of a turbine engine, the cooling air can be first compressed air flow 54 which bypasses the engine core 14, fluid from the LP compressor 22, or fluid from the HP compressor 24.

The engine component 80 includes a substrate 82 having a hot surface 84 facing the hot combustion gas flow H and a cooling surface 86 facing the cooling fluid C. The substrate 82 may form a wall of the engine component 80; the wall may be an exterior or interior wall of the engine component 80. The first engine component 80 can define at least one interior cavity or channel 88 comprising the cooling surface 86. The hot surface 84 may be an exterior surface of the engine component 80. In the case of a gas turbine engine, the hot surface 84 may be exposed to gases having temperatures in the range of 1000° C. to 2000° C. Suitable materials for the substrate 82 include, but are not limited to, steel, refractory metals such as titanium, or superalloys based on nickel, cobalt, or iron, and ceramic matrix composites. The superalloys can include those in equi-axed, directionally solidified, and single crystal structures.

In one particular embodiment, the substrate 82 is constructed from a ceramic matrix composite (CMC) material, which is a non-metallic material having high temperature capability. Exemplary CMC materials utilized for such substrate 82 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). In one embodiment, the CMC material is formed from a plurality of layers (e.g., about 4 to about 10 layers) in its thickness.

When made from a CMC material, an environmental barrier coating (EBC) may be present on the surface of the substrate 82 (not shown in the figures). For example, the EBC can include a bond coat (e.g., comprising silicon or silica), one or more layers formed from one or more rare earth silicates (e.g., one or more of a mullite layer, a mullite-alkaline earth aluminosilicate mixture layer, an yttrium monosilicate (YMS) layer, an ytterbium doped yttrium disilicate (YbYDS) layer, a barium strontium aluminosilicate (BSAS) layer, etc.), etc.

The CMC material is formed into plies of material having thicknesses of about 0.001 to about 0.018 inches, and most typically about 0.005 to about 0.015 inches. The thicknesses of the plies are usually dictated by the size of the fiber tows (filament bundles) selected for use, and the thicknesses of the plies may vary with fiber diameter. For most of the applications considered herein, the plies are formed as two-dimensional woven fabric, although one-dimensional fiber orientation may also be used. However, the method of manufacturing the plies, laying up the plies to form the component part and other parts manufacturing technology used in the composite industry are not meant to limit the present invention. The plies are laid up to form the shape of the article being formed, the angles of the adjacent plies may vary depending on the planar strength required. The components that can be made using these CMC materials include but are not limited to turbine blades, turbine vanes, turbine shrouds, and combustor liners, casings, heat shields and diffusers. These hot section components all benefit from the use of cooling air to provide sufficient cooling to accomplish heat transfer during engine operation, thereby extending their range of use.

The engine component 80 further includes one or more film hole(s) 90 extending through the substrate 82 that provide fluid communication between the interior cavity 88 and the hot surface 84 of the engine component 80. During operation, the cooling fluid flow C is supplied to the interior cavity 88 and out of the film hole 90 to create a thin layer or film of cool fluid (for example, air drawn from the compressor) on the hot surface 84, protecting it from the hot combustion gas flow H. While only one film hole 90 is shown in FIG. 3, it is understood that the engine component 80 may be provided with multiple film holes 90, which be arranged in any desired configuration on the engine component 80.

It is noted that, in any of the embodiments discussed herein, although the substrate 82 is shown as being generally planar, it is understood that that the substrate 82 may be curved for many engine components 80. However, the curvature of the substrate 82 may be slight in comparison to the size of the film hole 90, and so for the purposes of discussion and illustration, the substrate 82 is shown as planar. Whether the substrate 82 is planar or curved local to the film hole 90, the hot and cooling surfaces 84, 86 may be parallel to each other as shown herein, or may lie in non-parallel planes.

The film hole 90 can have an inlet 92 provided on the cooling surface 86 of the substrate 82, an outlet 94 provided on the hot surface 84, and a passage 96 connecting the inlet 92 and the outlet 94. The passage 96 is generally defined between the upstream inner surface 95 and the downstream inner surface 97, and can include a metering section 98 for metering of the mass flow rate of the cooling fluid flow C, and a diffusing section 100 in which the cooling fluid C may expand to form a wider cooling film. The metering section 98 can be a portion of the passage 96 with the smallest cross-sectional area orthogonal to the direction of cooling fluid flow C through the passage 96. The metering section 98 may be a discrete location at which the passage has the smallest cross-sectional area, or an elongated section of the passage 96. The diffusing section 100 is downstream of the metering section 98 with respect to the direction of cooling fluid flow C through the passage 96. The diffusing section 100 may be in serial flow communication with the metering section 98. The metering section 98 can be provided at or near the inlet 92, while the diffusing section 100 can be defined at or near the outlet 94. As shown in FIG. 3, the metering section 98 has a metering length $L_m$, and the diffusing section 100 has a diffusing length $L_D$. In certain embodiments, the diffusing length $L_D$ is longer than the metering length $L_m$ (e.g., $L_D \geq 2L_m$).

The cooling fluid flow C through the passage 96 is along the longitudinal axis of the passage 96, also referred to herein as the centerline 102, which passes through the geometric center of the cross-sectional area of the metering section 98. In the embodiment shown, the upstream inner surface 95 is substantially parallel to the centerline 102. The centerline 102 defines a centerline angle α relative to the local external surface tangent line 85. In particular embodiments, the centerline angle α is about 15° to about 50°. The downstream inner surface 97 extends at a diffusion angle φ with respect to the centerline 102 effectively widening the passage 96 to allow diffusion of the cooling air onto the hot surface 84. In certain embodiments, the diffusion angle φ is 0° to about 15° (e.g., greater than 0° to about 15°).

The film hole 90 can be inclined in a downstream direction of cooling fluid flow C through the passage 96 such that the centerline 102 is non-orthogonal to the hot surface 84 and to the cooling surface 86. Alternatively, the film hole 90 may have a centerline 102 that is orthogonal to one or both of the hot and cooling surfaces 84, 86 in the localized area of the substrate 82 through which the centerline 102 passes. In other embodiments, the centerline 102 of the film hole 90 may not be oriented in the direction of the hot combustion gas flow H, such that the vector of the cooling fluid flow C differs from that of the hot combustion gas flow H. For example, a film hole that has a compound angle defines a cooling flow vector that differs from the hot combustion gas flow vector not only in cross section, but also in the top-down view looking at the hot surface 84.

The film hole 90 generally has a tapered cross-section, which forms a conical shape therein. However, it is understood that the film hole 90 may have a cross-sectional shape that is circular, elliptical, conical, and other non-regular shapes. For example, the film hole 90 may include diffuser shapes (e.g., side bores) or other features as discussed in greater detail below.

The outlet 94 includes an upstream edge 104 and a downstream edge 106 at which the passage 96 intersects the hot surface 84 of the substrate 82. The edges 104, 106 can generally be defined relative to the direction of the hot combustion gas flow H, with the hot combustion gas flow H generally defining an upstream direction 108 and a downstream direction 110 relative to the hot surface 84, i.e. past the outlet 94. The upstream edge 104 generally faces the downstream direction 110 and the downstream edge 106 generally faces the upstream direction 108.

The engine component 80 is further provided with a flow conditioning structure 112 on the hot surface 84 of the substrate 82. The flow conditioning structure 112 is upstream of and physically spaced from the outlet 94 and is configured to interrupt the hot fluid flow H across the outlet 94 to allow the cooling fluid flow C emerging from the outlet 94 to more effectively adhere to the hot surface 84.

In the illustrated embodiment, the flow conditioning structure 112 comprises at least one ridge in the hot surface 84. The ridge 112 is not immediately adjacent to the outlet 94, but rather is separated from the outlet 94 by a buffer region 114 such that the ridge 112 is not physically connected with the film hole 90. When viewed in cross-section, as in FIG. 3, the ridge 112 has an upstream edge 116 and a downstream edge 118, defining a length $L_3$ therebetween relative to the direction of the hot combustion gas flow H. In one embodiment, the length $L_3$ is about 0.5d to about 2d, where d is the distance from the hot surface tangent line 85 to the ledge depth tangent line 117 as discussed below with respect to FIG. 3.

Figure 4:
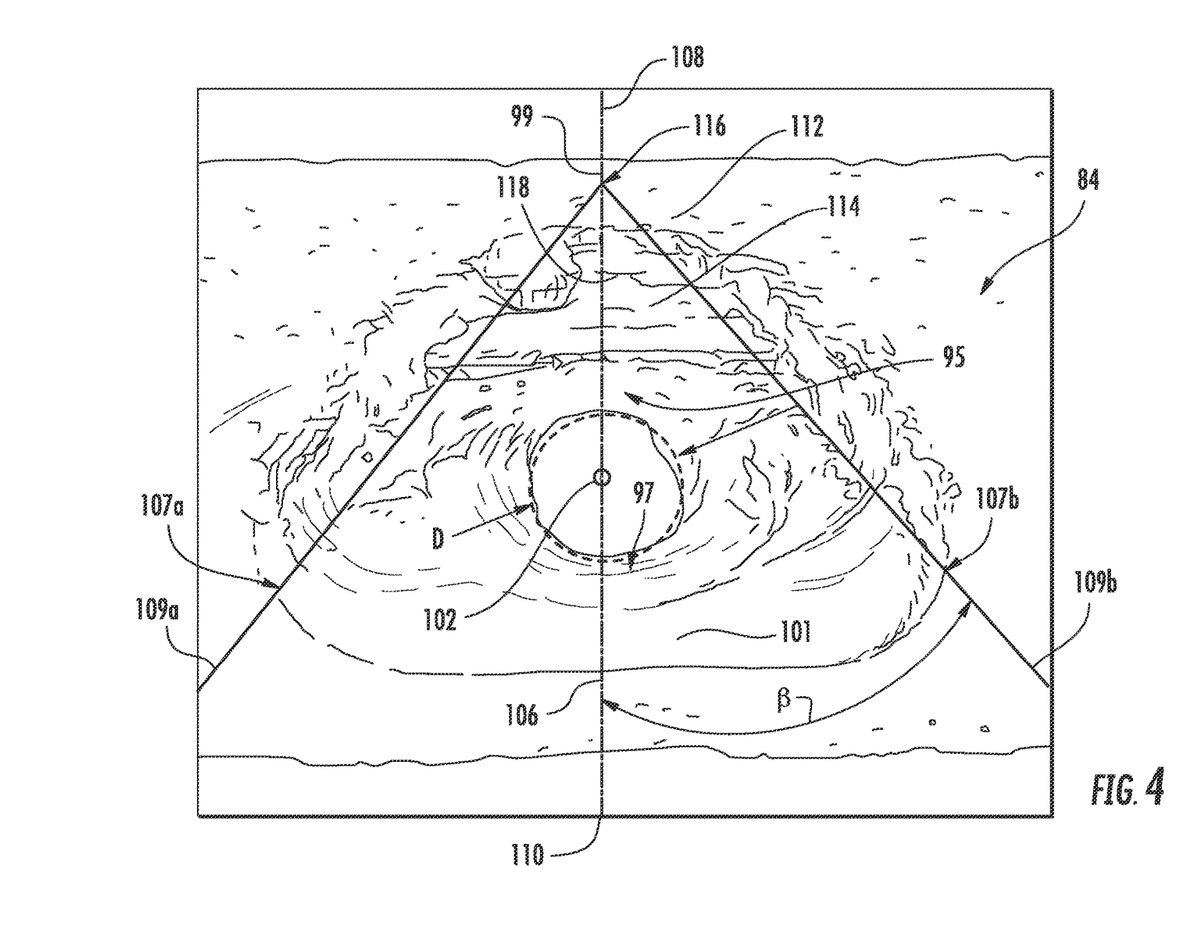
FIG. 4 is a perspective view through the film hole of FIG. 3 down the centerline.

The ridge 112 can be centered with respect to the centerline 102 of the film hole 90, and may extend at least partially around the outlet 94. For example, the ridge 112 can extend around at least about 50% of the upstream edge 104 forward of the centerline 102 (e.g., around at least about 75% of the upstream edge 104). In other words, the ridge can extend around at least about 90° of the upstream portion (i.e., at least about 50% of 180°) of the outlet 94, such as about around at least about 135° of the upstream portion. Referring to FIG. 4, the ridge 112 extends around 100% of the upstream edge 104 forward of the centerline 102 so as to completely shield the upstream edge 104 of the film hole 90 on the hot surface 84. As shown, the downstream edge 106 is free of any ridge extending above the hot surface tangent line 85 around at least about 50% of the downstream edge 106 downstream of the centerline 102 (e.g., around at least about 75% of the downstream edge 106).

The ridge 112 can have a varying height along its length around the upstream portion of the outlet 94. In most embodiments, the ridge 112 has a height h, defined from the peak of the ridge 112 to the hot surface tangent line 85, that is greater than 0 up to about d, where d is the distance from the hot surface tangent line 85 to the ledge depth tangent line 117 as discussed below with respect to FIG. 3.

The configuration of the ridge 112 for inducing the cooling fluid flow C emerging from the outlet 94 to adhere to the hot surface 84 may be at least partially defined by the cross-sectional shape of the ridge 112. The illustrated ridge 112 has a cross-sectional shape that is generally convex or outwardly curved between the upstream and downstream edges 116, 118. The cross-sectional shape of the ridge 112 may remain substantially constant or may vary.

The buffer region 114 extends between the upstream edge 104 of the outlet 94 and the downstream edge 118 of the ridge 112. In the embodiment shown, the buffer region 114 comprises a ledge 115 extending downstream of the ridge 112. The ledge 115 is recessed below the hot surface tangent line 85 so as to extend at a ledge depth d below the hot surface tangent line 85 defined by the hot surface 84. In one embodiment, wherein the substrate 82 is formed from a layered CMC material, the ledge depth d can have a thickness one or more layers (e.g., a thickness of about 1 layer to about 5 layers or plies). The ledge 115 defines a ledge depth tangent line 117.

The ledge 115 defines a length $L_1$ between the upstream edge 104 of the outlet 94 and the downstream edge 118 of the ridge 112. The length $L_1$ of the ledge 115 can vary, from being very small such that the ridge 112 is close to the outlet 94, to larger such that the ridge 112 is spaced farther from the outlet 94. The ledge 115 keeps the outlet 94 of the film hole 90 and its exit shaping separated in function and space from the ridge 112. This allows the cooling fluid flow C to fully form or spread at the outlet 94 of the film hole 90 before encountering the hot gas H that can modify this flow. On the maximum end of the range of possible lengths $L_1$, the buffer region 114 may not be so far away as to negate its conditioning effect on the fluid flow; as such, the maximum possible length $L_1$ may be dependent on the momentum of the cooling fluid flow C. Thus, the length $L_1$ of the ledge 115 is generally up to about 3d (e.g., about 0.5d to about 3d), where d is the distance from the hot surface tangent line 85 to the ledge depth tangent line 117 as discussed with respect to FIG. 3.

Without wishing to be bound by any particular theory, it is believed that the ledge 115 shields the cooling fluid flow C from initial interaction with the hot fluid flow H at its most vulnerable point, which is the upstream edge of the film hole. The ledge 115 can also force the cooling fluid flow C to be directed into a more surface tangential manner as it approaches the outlet 94, altering inspector said that it does not penetrate into the hot fluid flow H too far.

It is noted that the term "metering diameter (D)" as used with respect to the metering section 98 of this or any other embodiments of the invention is not meant to limit the metering section 98 to any particular cross-section, where the cross-section of the metering section 98 is determined perpendicular to the direction of the cooling fluid flow C through the passage 96. In this embodiment, the metering section 98 is generally circular in cross-section. However the specific cross-sectional shape of the metering section 98 may differ for other embodiment of the invention; for example, the cross-sectional shape of the metering section 98 may be rectangular or elliptical. For non-circular metering sections 98, the metering diameter D may be the hydraulic diameter of the cross-section, which is defined commonly as four times the cross-sectional area divided by the cross-sectional perimeter. For very irregular metering sections 98 that still are generally circular, such as those commonly produced by percussion laser machining, the metering diameter D may be the diameter of the largest circular pin that can be passed through the metering section 98 without damage. For non-circular sections that also have irregular surfaces, the metering diameter D may be the hydraulic diameter of the appropriately shaped largest pin that can be passed through without damage. For non-straight or non-constant cross section lengths prior to the diffusion section 100, the same overall definitions may be used at the minimum cross sectional area location.

As stated, the diffusing section 100 is downstream of the metering section 98 with respect to the direction of cooling fluid flow C through the passage 96, and is defined at or near the outlet 94. The diffusing section 100 generally includes a shelf 101 defined from the upstream shelf point 103 (defined where the downstream inner surface 97 intersects with the ledge depth tangent line 117) to the downstream edge 106 where the shelf 101 merges (at an angle with respect to the centerline 102 that is greater than the diffusion angle φ) with the hot surface 84. The shelf 101 generally has a length $L_2$ extending from the upstream shelf point 103 to the downstream edge 106. The length $L_2$ of the shelf 101 is generally up to about 5d (e.g., about 0.5d to about 5d), where d is the distance from the hot surface tangent line 85 to the ledge depth tangent line 117 as discussed with respect to FIG. 3. Without wishing to be bound by any particular theory, it is believed that the shelf 101 provides a shallow region for the cooling fluid flow C to laterally expand just prior to interacting with the hot fluid flow H.

As shown in FIG. 4, the downstream edge 106 of the outlet 94 is defined by the merging area of the shelf 101 with the hot surface 84. Generally, the width on either side of the centerline 99 of the shelf 101 at the downstream edge 106 can be defined by the lateral diffusion angle β relative to the centerline 99. Specifically, lateral diffusion angle β extends from the downstream edge 106 at the centerline 99 to the lateral diffusion line 109a, 109b on each side of the downstream edge 106. Each lateral diffusion line 109a, 109b extends from the upstream edge 116 of the ridge 112 to the outermost point 107a, 107b of the downstream edge 106. In most embodiments, the lateral diffusion angle β is greater than 0° to about 15°.

Figure 5:
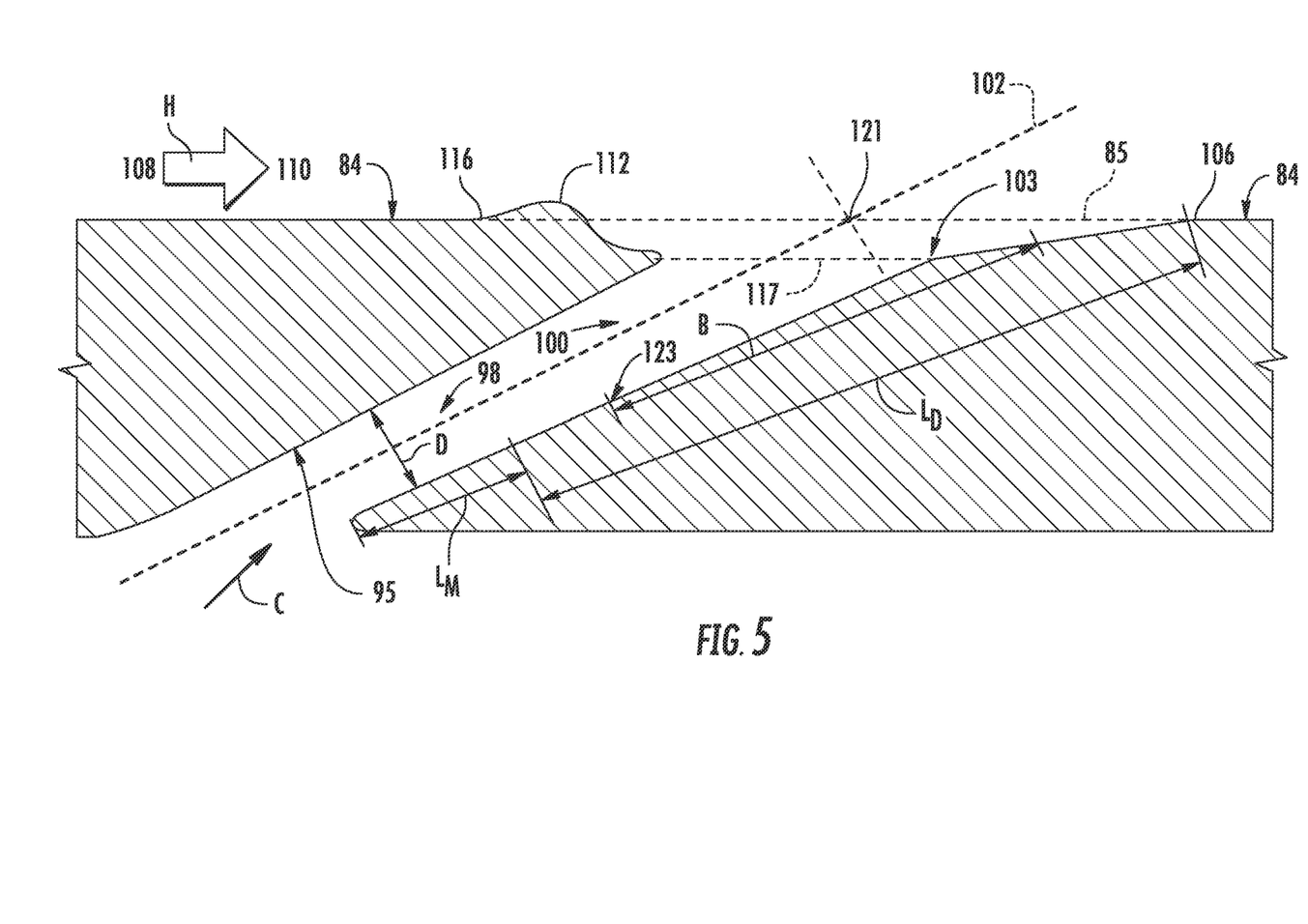
FIG. 5 is another schematic, sectional view through a film hole of an engine component of the engine from FIG. 1 according to one embodiment.
Figure 6:
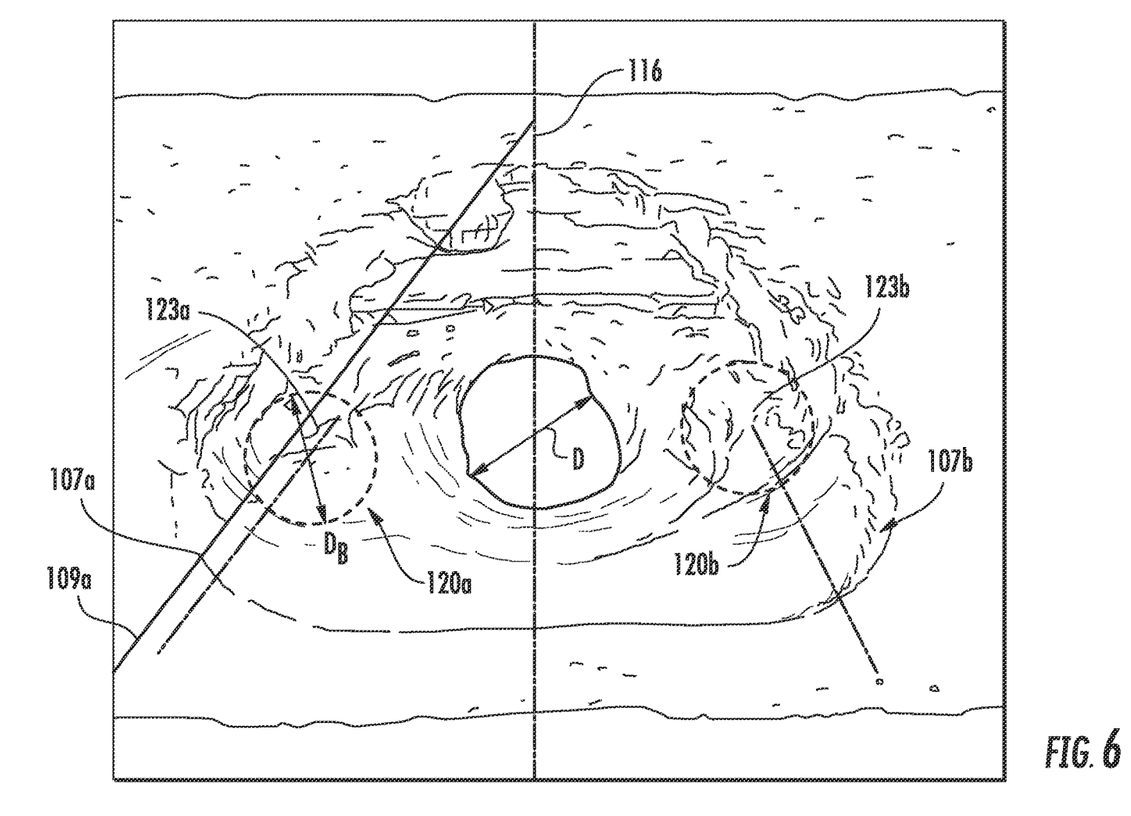
FIG. 6 is another perspective view through the film hole of FIG. 3 down the centerline.

Referring now to FIGS. 5 and 6, there are two outer lobes 120a, 120b defined in the diffusion section 100 of the film hole 90. Each of the outer lobes 120a, 120b serve as a diffusing mechanism allowing the cooling fluid flow C to laterally expand in the transition from the metering section 98 to the diffusion section 100. Without wishing to be bound by any particular theory, it is believed that the outer lobes 120a, 120b modify the vortices associated with the cooling fluid flow C prior to their interaction with the hot fluid flow H.

Each of the outer lobes 120a, 120b has a depth that is measured along the respective lateral diffusion line 109a, 109b as a bore depth B, which is measured down the centerline 102 to the respective base 123a, 123b of each outer lobe 120a, 120b. The bore depth B can be compared to the overall diffusing length $L_D$, which is, in most embodiments, between about 0.1 to about 0.75 of the length $L_D$ (i.e., B is about 10% to about 75% of the length $L_D$).

FIG. 6 shows that each of the outer lobes 120a, 120b has a bore effective diameter $D_B$ that is less than or equal to the metering diameter D. In most embodiments, the bore effective diameter $D_B$ is between about 0.5 to about 1 of the metering diameter D (i.e., $D_B$ is about 50% to about 100% of the metering diameter D).

Figure 7:
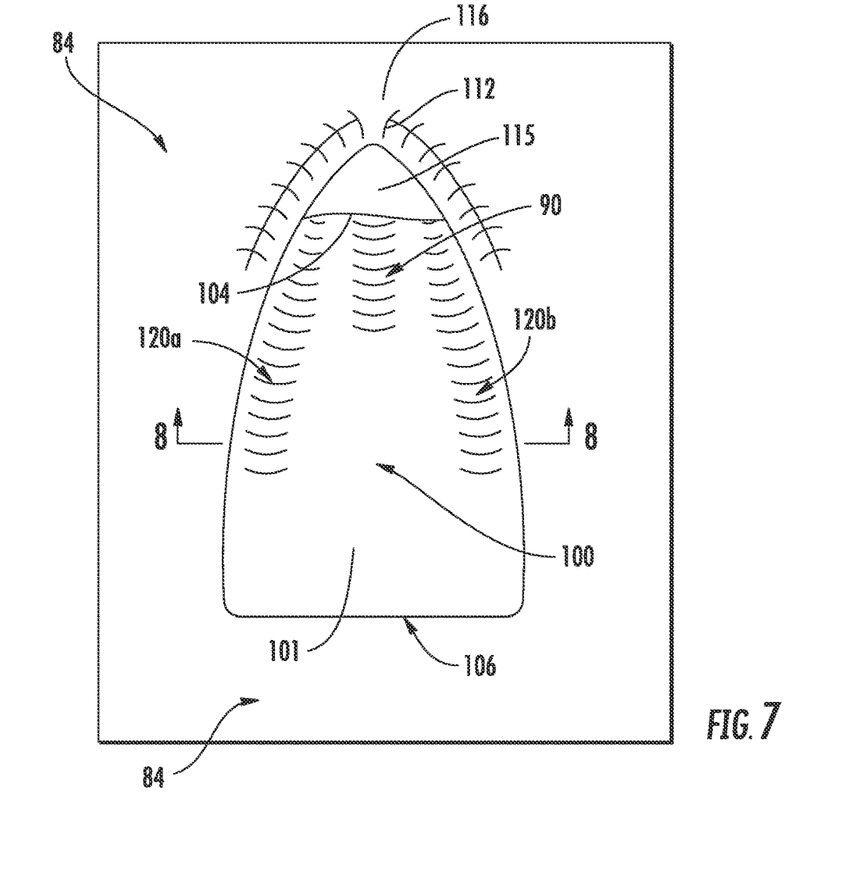
FIG. 7 is a top view of the film hole of FIG. 3.
Figure 8:
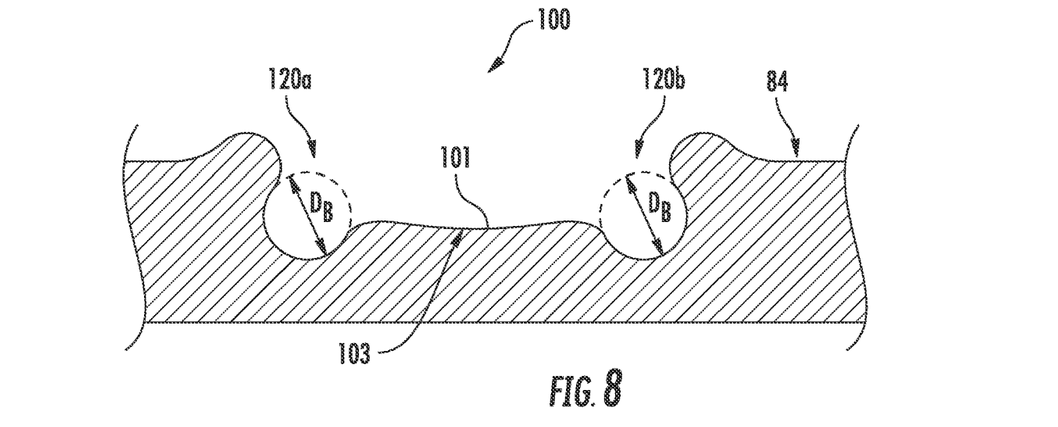
FIG. 8 is a cross-sectional view taking perpendicular to that of FIGS. 3 and 5 at the upstream shelf point.

FIGS. 7 and 8 more particularly show the contour of the outer lobes 120a, 120b defined in the diffusing section 100, with the shelf 101 located between each of the outer lobes 120a, 120b. It is noted that the respective bore bases 123a and 123b may extend into the hole such that they are hidden from the view in FIG. 7. Referring to FIG. 8, which is a cross-sectional view of the diffusing section 100 taken at the upstream shelf point 103 of FIGS. 3 and 5, the outer lobes 120a, 120b are positioned on the opposite ends of the diffusing section 100 with the shelf 101 positioned therebetween. The outer lobes 120a, 120b generally define bores along the sides of the diffusing section 100 that are deeper than the shelf 101. In particular embodiments, the outer lobes 120a, 120b are defined by a surface of the diffusing section 100 along their respective diameters for at least about 150° of each outer lobes 120a, 120b (e.g., more than 180° of each outer lobes 120a, 120b are physically defined by a surface), such as about 180° to about 270°.

In particular embodiments, the film hole(s) are produced with a pulsing laser using a continuous helical motion to produce the shape, followed by the use of a percussion drill to produce the meter. For example, the laser drilling process can utilize a Nd:YAG laser, although any other laser that is adaptable to produce the desired results may be used. The laser can produce cooling apertures having a predetermined metering diameter D (e.g., from about 0.010 to about 0.030 inches). The apertures may be drilled relative to the surface of the component at an angle commensurate to produce the centerline angle α, as shown in FIG. 3 (e.g., about 15° to about 50°).

In one embodiment, the film hole(s) are produced with the spot size of the laser correlating to the metering diameter D of the desired hole size. Moving the laser in a helical motion allows cross-section of the film hole to be formed as desired. The laser ablates CMC material immediately below its focal point, thereby creating the aperture. Simultaneously, the laser energy is sufficient to melt the SiC or SiN matrix material immediately adjacent to it. The progression of the drilling operation occurs so quickly that the melted material flows only a short distance before re-solidifying along the newly created surface as recast material as the pressurized air from the laser nozzle assists in cooling it. The recast material is substantially silica that forms an oxidation barrier along the surface of the newly created aperture so that deterioration of the CMC material along this surface will not occur as cooling air is introduced into the passage. It will be recognized by those skilled in the art that "cooling air" introduced into a component to maintain its temperature below the temperature of the surrounding atmosphere, can have a high temperature in excess of 1700° F.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. An engine component for a gas turbine engine generating hot combustion gas flow, comprising:
   a substrate constructed from a CMC material and having a hot surface in contact with the hot combustion gas flow and a cooling surface facing a cooling fluid flow, the hot combustion gas flow generally defining an upstream direction and a downstream direction relative to the hot surface, and wherein the substrate defines a film hole extending through the substrate and having an inlet provided on the cooling surface, an outlet provided on the hot surface, and a passage connecting the inlet and the outlet; and
   a flow conditioning structure provided upstream of the outlet on the hot surface, wherein the flow conditioning structure comprises a continuous ridge extending from an upstream edge to a downstream edge and above a tangent line of the hot surface, wherein the flow conditioning structure has a cross-sectional shape that is curved outwardly from the hot surface between the upstream edge and downstream edge, wherein the continuous ridge extends around at least 45° on either side of a centerline so as to extend around at least 90° of the outlet along an upstream portion of the outlet, and wherein the continuous ridge terminates upstream or in line with a downstream edge of the outlet in an axial direction.

2. The engine component as in claim 1, wherein the ridge extends around at least 135° of the outlet along an upstream portion of the outlet.

3. The engine component as in claim 1, wherein the ridge is separated from the outlet by a buffer region.

4. The engine component as in claim 1, wherein the passage of the film hole defines a cross-sectional area between an upstream inner surface and a downstream inner surface, wherein the upstream inner surface is substantially parallel to a centerline through the passage.

5. The engine component as in claim 4, wherein the downstream inner surface has a diffusing angle with respect to the centerline through the passage, wherein the diffusing angle is 0° to 15°.

6. The engine component as in claim 4, wherein the downstream inner surface has a diffusing angle with respect to the centerline through the passage, wherein the diffusing angle is greater than 0° to 15°.

7. The engine component as in claim 4, wherein a diffusing section is downstream of a metering section with respect to a cooling fluid flow through the passage and is defined at or near the outlet.

8. An engine component for a gas turbine engine generating hot combustion gas flow, comprising:
a substrate constructed from a CMC material and having an outermost hot surface facing the hot combustion gas flow and a cooling surface facing a cooling fluid flow, the hot combustion gas flow generally defining an upstream direction and a downstream direction relative to the hot surface, and wherein the substrate defines a film hole extending through the substrate and having an inlet provided on the cooling surface, an outlet provided on the hot surface, and a passage connecting the inlet and the outlet; and
a flow conditioning structure provided upstream of the outlet in the outermost hot surface, wherein the flow conditioning structure comprises a continuous ridge extending above a tangent line of the outermost hot surface, wherein the ridge is separated from the outlet by a buffer region of the outermost hot surface, wherein the continuous ridge extends around at least 45° on either side of a centerline so as to extend around at least 90° of the outlet along an upstream portion of the outlet, and wherein the buffer region comprises a ledge extending downstream of the ridge and recessed below the tangent line of the hot surface, wherein the ledge defines a ledge depth tangent line extending therefrom at a ledge depth.

9. The engine component as in claim 8, wherein the ridge has a length defined from an upstream edge to a downstream edge along a tangent line of the hot surface, the length being 0.5 to 2 times the ledge depth.

10. The engine component as in claim 8, wherein the ridge has a height defined from a peak of the ridge to a tangent line of the hot surface, the height being greater than 0 up to the ledge depth.

11. The engine component as in claim 8, wherein the ledge defines a length that is up to 3 times the ledge depth.

12. The engine component as in claim 8, wherein the ledge defines a length that is 0.5 to 3 times the ledge depth.

13. The engine component as in claim 8, wherein the film hole comprises a metering section defining a smallest cross-sectional area orthogonal to the direction of cooling fluid flow through the passage.

14. The engine component as in claim 13, wherein the film hole further comprises a diffusing section downstream of the metering section with respect to the direction of cooling fluid flow through the passage.

15. The engine component as in claim 14, wherein the diffusing section expands laterally such that the cooling fluid forms a wider cooling film at the hot surface.

16. The engine component as in claim 15, wherein the diffusing section includes a shelf.

17. The engine component as in claim 16, wherein the shelf has a length that is up to 5 times the ledge depth.

18. The engine component as in claim 16, wherein the shelf provides a shallow region for the cooling fluid to laterally expand prior to interacting with the hot fluid.

19. The engine component as in claim 16, wherein a downstream edge of the shelf merges with the hot surface, the downstream edge having a width on either side of a centerline of the shelf at the downstream edge defined by a lateral diffusion angle relative to the centerline, wherein the lateral diffusion angle is greater than 0° to 15°.

* * * * *